C. L. SHEPPY.
JOINT COVER OR PROTECTOR.
APPLICATION FILED JULY 22, 1920.
1,389,224.
Patented Aug. 30, 1921.
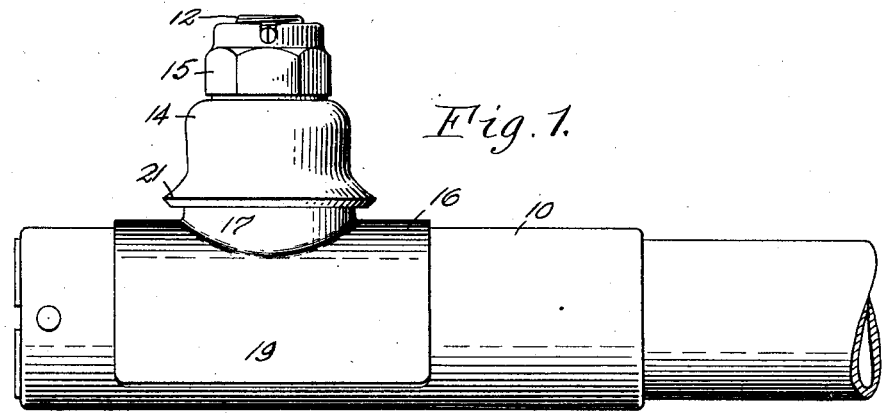
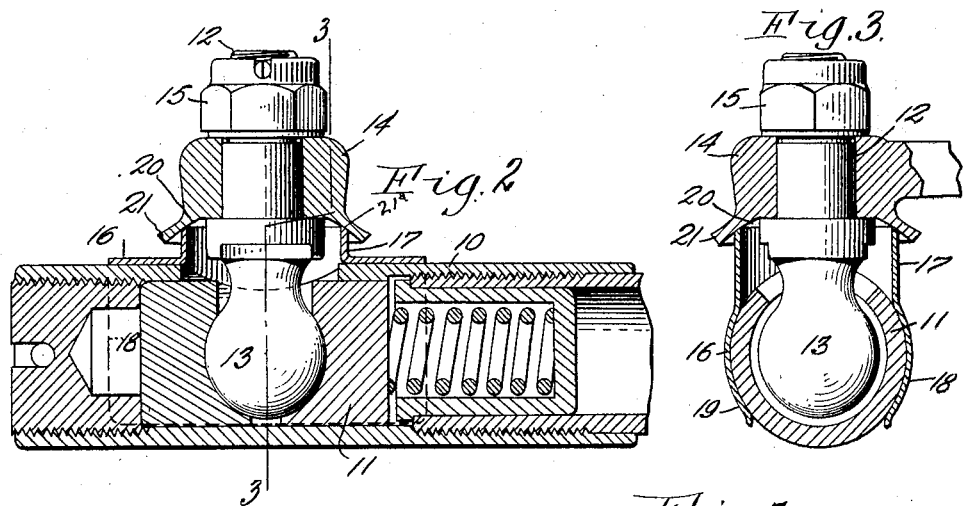
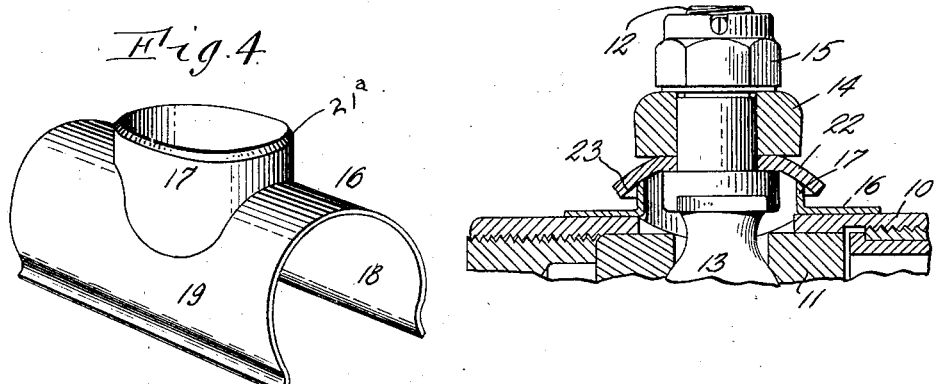
Inventor.
Charles L. Sheppy
by Parker & Roemau
Attorneys.

UNITED STATES PATENT OFFICE.

CHARLES L. SHEPPY, OF BUFFALO, NEW YORK.

JOINT COVER OR PROTECTOR.

1,389,224.　　　　Specification of Letters Patent.　　Patented Aug. 30, 1921.

Application filed July 22, 1920. Serial No. 398,141.

*To all whom it may concern:*

Be it known that I, CHARLES L. SHEPPY, a citizen of the United States, residing at Buffalo, in the county of Erie and State of New York, have invented a new and useful Improvement in Joint Covers or Protectors, of which the following is a specification.

This invention relates to protective coverings for joints and sockets and is especially adapted for use in connection with ball joints.

The objects of the invention are to produce a cover or protector which may be easily and cheaply manufactured, which lends to facility of assemblage, which is not liable to destructive wear under any normal conditions of usage, and which will effectively operate at all times to exclude any dust or foreign matter from the joint and to retain lubricant within the joint.

With the above and other objects in view, my invention consists of certain features of structure and combination which will be more fully set forth hereinafter.

One embodiment of the invention is illustrated in the accompanying drawings, wherein:

Figure 1 is a side elevation of a joint equipped according to my invention.

Fig. 2 is a vertical section through the joint as illustrated in Fig. 1.

Fig. 3 is a section taken on line 3—3 of Fig. 2.

Fig. 4 is a perspective view of the improved joint cover.

Fig. 5 is a sectional elevation showing a modified form of protector.

Referring to the drawings wherein similar numerals denote like parts throughout the several views, as illustrated, a joint covering constructed according to the invention is used in connection with a steering knuckle connection of a vehicle, but it is to be understood that the invention is in no wise limited to this specific use, but is capable of use with various other types of joints.

In the embodiment illustrated in the drawings, the numeral 10 designates a tubular rod casing, 11 being the usual socket member positioned therein. A pin 12 having a spherical head 13 is positioned in and extends from the socket and is connected to a usual lever arm head 14. The lever head is maintained in place on the pin by the nut 15.

In connection with the known elements just above set forth, there is provided a protective cover or sleeve member 16 which comprises the collar portion 17 and the depending flanged side portions 18 and 19 which are adapted to tightly fit and partially surround the side walls of the tube 10. This sleeve or collar is preferably constructed of spring metal so that the flanged sides will grip the walls of the tube tightly. It is also considered preferable to construct the collar portion in such proportions that its diameter is slightly greater than the diameter of the ball head of the pin, and smaller than that of the lever head 14. The upper edge of the collar portion 17 is adapted to make a close joint with the under edge of the lever head and in the preferred form illustrated in Figs. 1 to 4 inclusive of the drawings, in order to maintain such close joint the lever head is recessed as at 20, thereby providing a concave inner surface, and overhanging edges or flanges as at 21. The edge of the collar is shaped to fit the concave surface as at 21ᵃ and the concave surface is concentric with the center of the ball joint to maintain a close contact in different positions of the ball and socket. The concave inner surface and overhanging flanges may be formed by machining or cutting away the underside of the lever head by any suitable means.

In some instances, it is considered desirable to dispense with the machining or recessing of the lever head and, with this idea in view, as shown in the modified form illustrated in Fig. 5 of the drawings, the lower part of the head is left in its original form and a washer designated by 22 is provided, which washer is adapted to be positioned on the shank of the pin between the lower part of the lever head and the collar 17 and is formed with a concave, recessed, lower face as indicated at 23, whereby it fits closely against and overhangs the collar portion.

In a device constructed according to this invention it will be seen that movement of the lever is permitted in a plane transversely of the rod casing and certain movement in directions longitudinal of the rod without at any time breaking the sealing connection between the protecting sleeve and the rod casing and the lever, and that the concentric relation of the concave inner face of the lever head, the collar, and the ball pin permit limited universal movement while maintaining a close joint between the parts. Also, the parts may be quickly and easily assembled and no packing is required. While effectively operating to prevent any dirt or foreign matter from entering the joint, the covering also acts to retain oil or grease in the joint, whereby constant and efficient lubrication may be maintained.

I claim as my invention:—

1. The combination, with a casing member having a lateral opening therein, a second member extending into said opening and adapted to move relatively to said first named member, and a head on said second member externally of said casing, of a sleeve member on said casing member and having a projecting collar spaced from and surrounding a portion of said second named member and making a close joint with the inner side of said head.

2. In a rod joint, a casing inclosing a socket member, a sleeve on said casing, said sleeve being provided with a projecting collar, a pin projecting from said socket and through said collar, a lever head connected to said pin externally of the casing, and means at one side of said lever head providing a recessed inner side and an overhanging flange partially inclosing and making a close joint with said collar.

3. In a rod coupling, a rod having a socket therein, a ball pin in said socket and having a shank projecting beyond said rod, a lever provided with a head connected to the shank of said pin and adapted for movement relatively to said rod, means associated with said head comprising a recessed, undercut inner face forming an inwardly projecting annular flange, and a sleeve mounted for movement on said rod, said sleeve being formed with a collar surrounding a portion of said pin shank and forming a close joint with said recessed inner face.

4. In a rod coupling, a casing having a socket member therein, a ball pin seated in said socket and projecting therefrom, a lever having a head secured to said ball pin externally of said casing, a sleeve member mounted on said casing and provided with a collar projecting therefrom, said collar surrounding a portion of the projecting pin, a washer on said pin between said lever head and said collar, said washer having a concave, inner surface providing an overhanging flange concentric with and bearing upon said collar whereby a dust tight connection is maintained between said lever head and said casing.

Witness my hand this 19th day of July, 1920.

CHARLES L. SHEPPY.

Witnesses:
C. F. MAGOFFIN,
CHARLES PLEUTHNER.